Jan. 5, 1937. A. F. WHITE 2,066,866
CONTINUOUS FLOW CONVEYER
Filed Aug. 26, 1935
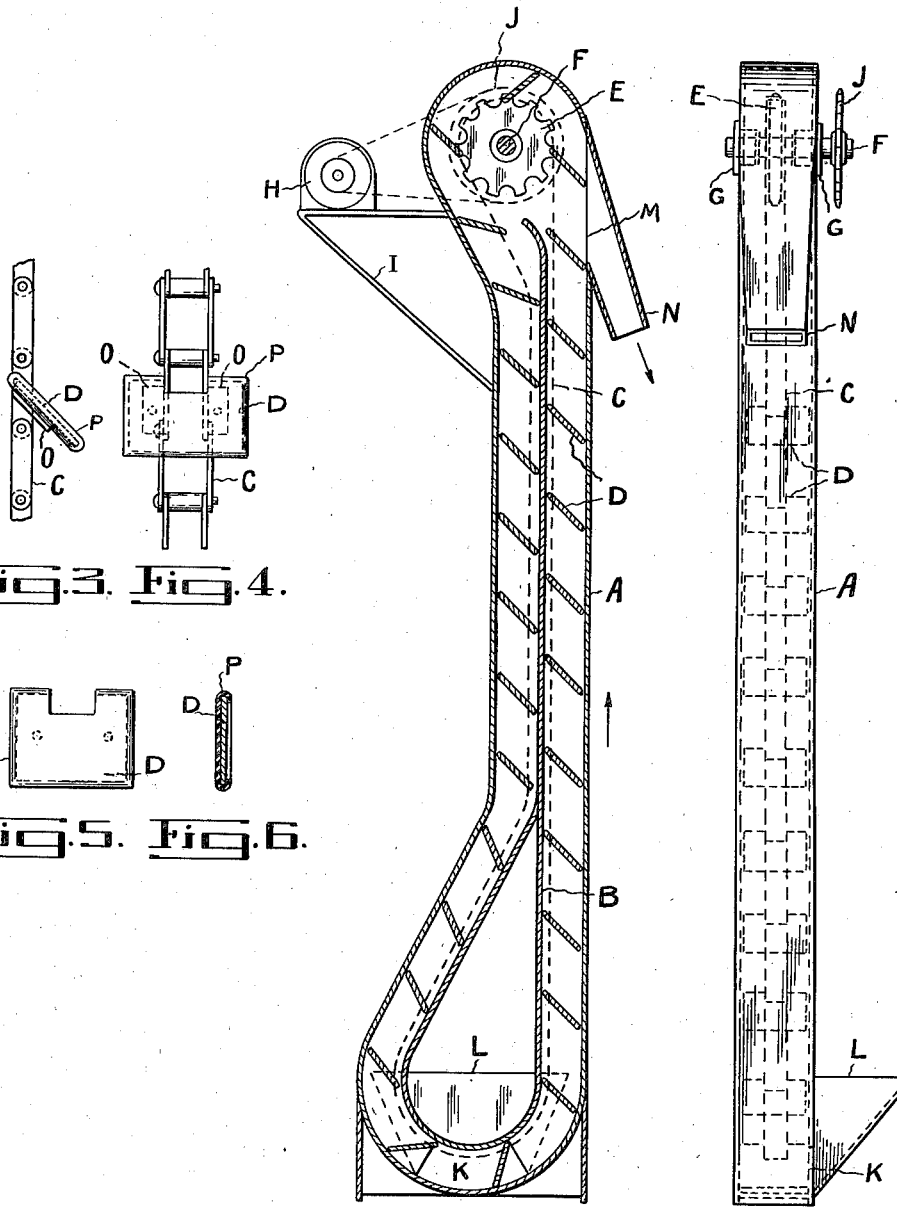
Inventor
A. F. White
by J. Edw. Maybee
ATTY.

Patented Jan. 5, 1937

2,066,866

UNITED STATES PATENT OFFICE 2,066,866

CONTINUOUS FLOW CONVEYER

Albert F. White, Toronto, Ontario, Canada

Application August 26, 1935, Serial No. 37,880
In Canada April 18, 1935

2 Claims. (Cl. 198—154)

This invention relates to continuous flow conveyers and more particularly to conveyers having conveyer chains moving in closed conduits for conveying comminuted material such as grain and bulk material whose degree of subdivision is such that it can be poured.

Conveyers of the above general type are known wherein the material is conveyed in buckets attached to the chain also wherein a series of loops and links are attached to the conveying chains and the material is carried along depending on the friction of the material itself.

The present invention has for its main object to provide for an improved type of conveyer with flat flights or slats, hereafter known as flights, attached to the conveyer chain with attachments on the chain to enable the flights to operate at an angle of forty-five degrees or more so that the material when being carried up vertically or at an angle from the vertical will flow out of the opening in the conduit or casing and automatically discharge as the flights pass the opening, owing to the angle being sufficiently steep to cause the material to slide off the flights.

By constructing a conveyer in accordance with the invention it is possible to get a greater capacity at a much slower speed than with the conventional type of bucket elevator, therefore the head or driving sprocket may be smaller, also there is no necessity of having a sprocket at the bottom or boot end. Owing to the slope of the flights and the action of the material against the flights when the material is fed with a hopper feed at the side and at the bottom end the result is there is a smooth operation and no tendency to stick or jam.

The flights may be made of metal, wood, fibre or hard rubber and in order to eliminate noise metal flights covered with rubber thickened at the edges may be used and it is preferable that this rubber be vulcanized on to the metal flights.

Conveyers embodying the features of the present invention may be variously constructed to suit the requirement but the invention will be well understood by reference to the accompanying drawing.

Figure 1 shows a sectional side elevation and Figure 2 shows a front elevation of a vertical type elevator constructed in accordance with the present invention. Figures 3 and 4 are front and side elevations showing the method of attaching the flights to a standard conveyer chain. Figures 5 and 6 are a front and side view of a flight showing a flight with rubber vulcanized on to the metal.

Referring now to the drawing and particularly to Figures 1 and 2, an outer casing either wood or metal is shown at A, and a dividing partition making the casing into two separate conduits is shown at B. This partition is made to form a loop at the bottom, the outer casing is also made in the form of a loop to conform with the inner partition making a semicircular space at the bottom to guide the chain and flights C and D around.

The flights D are bolted to lugs O on the links of the chain C (see Figs. 3 and 4) and are covered by rubber P vulcanized on to the metal.

The chain and flights C and D are driven in the conventional manner common to all bucket elevators by a sprocket E at the top, supported by shaft and bearings F and G, and driven from a line shaft or by any convenient method but the most desirable means would be by a slow speed electric motor, H supported from a bracket I, attached to the elevator casing and driven by a chain and sprockets J. An opening K with chute L is provided at the bottom and an outlet is provided at M and the material is delivered out at spout N. Direction of operation is shown by arrow.

In operation it is seen that the driving force transmitted through the sprocket E causes same to rotate, and the chain with flights will move up with material collected through the opening K, and the material will be carried up the conduit until it reaches the opening M when it will flow out and slide off the flight as it passes the space at opening M.

Having now particularly described and ascertained the nature of my said invention and in what manner the same is to be performed, I declare that what I claim is:

1. A continuous flow elevator including an upwardly extending casing formed with a substantially entirely closed rising leg and a bottom loop and having an inlet into the loop and a front outlet in the rising leg; and a conveyer element comprising an endless chain movably mounted to move longitudinally of the casing and round the loop and a plurality of spaced, transverse, conveyer flights secured to the chain and each substantially filling the cross section of the rising leg and bottom loop of the casing, each flight being inclined to the horizontal from back to front and also to the length of the chain to discharge through the outlet as it reaches the level of said outlet, the back and front edges of each flight being substantially parallel to the axis of the loop.

2. A continuous flow elevator including an upwardly extending casing formed with a substantially entirely closed vertical rising leg and a bottom loop and having an inlet into the loop and a front outlet in the rising leg; and a conveyer element comprising an endless chain movably mounted to move longitudinally of the casing and round the loop and a plurality of spaced, transverse, conveyer flights secured to the chain and each substantially filling the cross section of the rising leg and bottom loop of the casing, each flight being inclined to the horizontal from back to front and also to the length of the chain to discharge through the outlet as it reaches the level of said outlet, the back and front edges of each flight being substantially parallel to the axis of the loop.

A. F. WHITE.